United States Patent
Speetzen et al.

(10) Patent No.: US 7,788,018 B2
(45) Date of Patent: Aug. 31, 2010

(54) METHOD FOR CONTROLLING AN INTERNAL COMBUSTION ENGINE

(75) Inventors: Ralf Speetzen, Friedrichshafen (DE); Günther Schmidt, Friedrichshafen (DE); Albert Kloos, Friedrichshafen (DE); Andreas Kunz, Friedrichshafen (DE); Michael Willmann, Bermatingen (DE); Jörge Remele, Hagnau (DE); Marc Hehle, Constance (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 252 days.

(21) Appl. No.: 12/221,722

(22) Filed: Aug. 6, 2008

(65) Prior Publication Data
US 2009/0043482 A1 Feb. 12, 2009

(30) Foreign Application Priority Data
Aug. 6, 2007 (DE) .................... 10 2007 037 037

(51) Int. Cl.
*B60T 7/12* (2006.01)
*F02M 35/00* (2006.01)

(52) U.S. Cl. .............. 701/103; 701/105; 701/111; 123/434; 123/681; 123/295

(58) Field of Classification Search ......... 701/103–105, 701/111; 123/295, 406.23, 406.29, 434, 123/478, 480, 681
See application file for complete search history.

(56) References Cited

U.S. PATENT DOCUMENTS 4,653,449 A * 3/1987 Kamei et al. ............... 123/478
5,048,495 A * 9/1991 Onari et al. ................. 123/492
6,631,704 B2 * 10/2003 Ogawa et al. .............. 123/295
6,688,282 B1 * 2/2004 Okubo et al. ........... 123/339.11
7,150,275 B2 * 12/2006 Baldauf et al. ............. 123/681
7,182,064 B2 2/2007 Dölker et al.
7,207,305 B2 4/2007 Dölker
7,272,486 B2 9/2007 Speetzen et al.
2002/0020386 A1 * 2/2002 Ogawa et al. .............. 123/295

FOREIGN PATENT DOCUMENTS

| DE | 103 02 263 | 3/2004 |
|----|------------|--------|
| DE | 10344181   | 4/2005 |
| EP | 1 283 951  | 2/2003 |
| EP | 103 15 881 | 11/2004 |
| EP | 1 736 659  | 12/2006 |

* cited by examiner

*Primary Examiner*—John T Kwon
(74) *Attorney, Agent, or Firm*—Lucas & Mercanti, LLP; Klaus P. Stoffel

(57) ABSTRACT

A method for controlling an internal combustion engine having a common rail system together with individual accumulators. A rotational speed-control deviation (dn) is determined from a target rotational speed (nSL) that represents the set point for an outer control loop to control the rotational speed, as well as from an actual rotational speed (nIST). A target torque (MSL) is determined from the rotational speed-control deviation (dn) via a rotational speed controller as a master controller. A target injection duration (SD(SOLL)) is determined from the target torque (MSL). The target duration injection (SD(SOLL)) represents the set point for an inner control loop for controlling cylinder-specific injection duration. An injection duration deviation is determined from the target injection duration (SD(SOLL)) and from an actual injection duration. A correcting variable is determined from the injection duration deviation via an injection duration controller as a follow-up controller, and an injection duration is determined from the correcting variable and the target injection duration for activating the injectors.

6 Claims, 2 Drawing Sheets

METHOD FOR CONTROLLING AN INTERNAL COMBUSTION ENGINE

BACKGROUND OF THE INVENTION

The invention relates to a method for controlling an internal combustion engine. According to the method a correcting variable is calculated by an injection duration controller via an outer control loop, such outer control loop being based on rotational speed, and an inner control loop, such inner control loop being based on the injection duration. The correcting variable is linked to the target injection duration to activate the injectors.

For the most part, the regulation of an internal combustion engine, for example as a generator drive, takes place in a control loop structure that is based on rotational speed or torque. Due to tolerances in the signal chain and in the injection devices, different amounts of fuel are injected into the individual cylinders of the internal combustion engine, whereby different torque contributions of the cylinders are produced. Thus, to achieve a stable control loop it is necessary to filter the controlled variable. A control loop based on rotational speed for an internal combustion engine with common rail system is for example known from DE 103 02 263 B3.

An additional measure is the so-called running smoothness control. From EP 1 283 951 B1, for example, a method for adjusting cylinder-specific profiles of injection quantities is known, with the distribution of the injection amounts being determined based on the rotational speed signal. Accordingly, a correction value is established for adjusting the injection amounts to be supplied to the cylinders to an average value, and the beginning of the interval, namely the start of the injection, and simultaneously the end of the control interval, namely the end of the injection, of the respective cylinder is changed by the correction value.

In practice, controlling the adjustment of an internal combustion engine is expensive, since such engine does not constitute a linear closed-loop controlled system. Moreover, there must be protection against malfunction, for example, in the event capturing of the controlled variable fails.

SUMMARY OF THE INVENTION

Accordingly, it is an object of the invention to provide a control method for a cylinder-specific control, with such method being easily adjustable and featuring high operational safety.

Easy adjustability is achieved by a control method for a cascaded rotational speed control loop as outer control loop and a control loop for the injection duration as inner control loop, since malfunctions no longer run through the entire closed-loop controlled system, and non-linearities are linearized in the first section by the follow-up controller in the inner control loop. Specifically, the control method is characterized in that a rotational speed deviation is calculated from a target rotational speed, such target rotational speed representing the set point for the outer control loop to regulate the rotational speed, as well as from an actual rotational speed of the internal combustion engine. A rotational speed controller, as master controller, calculates a target torque from the rotational speed control deviation. A target injection duration in turn is determined from the target torque. The target injection duration corresponds to the set point for the inner control loop for the cylinder-specific regulation of the injection duration. From the target injection duration and from an actual injection duration a deviation from the injection duration is calculated, from which a control signal is then determined via an injection duration controller as a follow-up controller. From the control signal in turn and the target injection duration the injection duration for the cylinder-specific control of the injectors is then calculated.

By linking the control signal with the target injection duration high operational safety is achieved, since, for example, in the event the actual injection duration detection or the injection duration controller fails, continued operation of the internal combustion engine on the basis of the target injection duration is possible. The evaluation of the correcting variable calculated via the injection duration controller also contributes to increasing operational safety. If the value of the correcting variable is permissible, no further intervention takes place. Otherwise, the correcting variable is limited to an upper limit and a maintenance recommendation is generated.

To improve the dynamics of the inner control loop and to compensate for age-related changes in the closed-loop control systems, such as for example drift of the injectors, precontrol to determine a precontrol value is intended. The injection duration controller is supplied with the precontrol value for the purpose of a correction.

The precontrol value is determined via a characteristic curve as a function of the target injection duration and the rail pressure. The characteristic curve is populated with the values of the correcting variable calculated via the injection duration controller.

One embodiment provides for the actual injection duration to be calculated from one injection end and one virtual injection beginning. The virtual injection beginning is calculated by detecting and storing the pressure of a specific individual accumulator during a measurement interval, by determining the end of the injection from a significant change in the fuel pressure based on the pressure curve of a specific stored individual accumulator, and by calculating the virtual beginning of the injection via a mathematical function against the end of the injection. Operational reliability is advantageous in this connection, since in practice determining the actual beginning of the injection from the rail pressure signal is faulty due to pressure variations in the rail interfering with each other. As is known, the rail pressure memorizes the pumping frequency of the low-pressure pump, of the high-pressure pump and the injection frequency.

Other features and advantages of the present invention will become apparent from the following description of the invention.

DETAILED DESCRIPTION OF THE INVENTION

Figure 1:
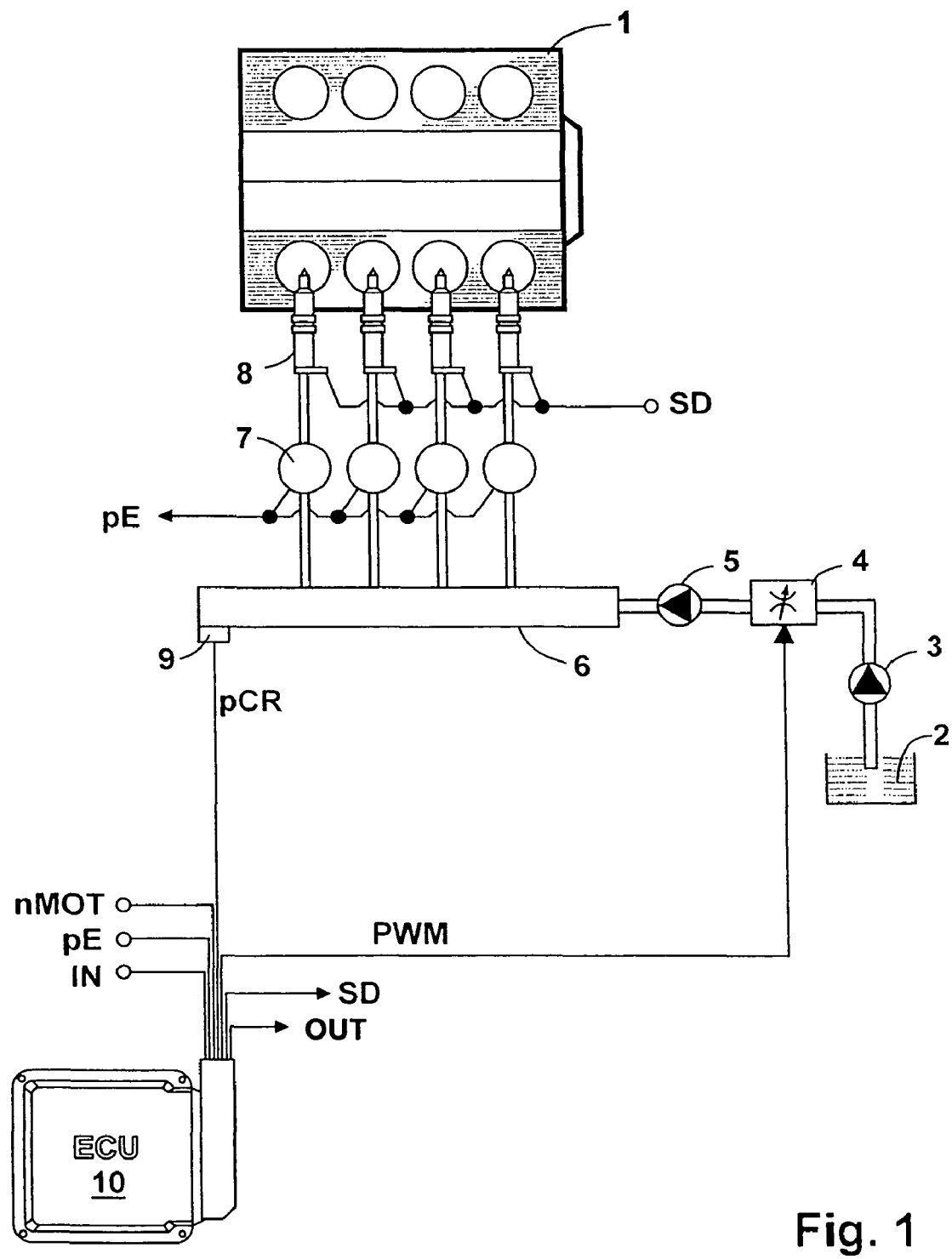
FIG. 1 shows a system diagram.

FIG. 1 shows a system diagram of an electronically controlled internal combustion engine 1. The fuel is injected via a common rail system. The system is comprised of the following components: a low-pressure pump 3 to pump fuel from a fuel tank 2, a suction throttle 4 to determine a volume flow, a high-pressure pump 5 to pump the fuel into a rail 6 under increased pressure, individual accumulators 7 for temporarily storing the fuel, and injectors 8 to inject the fuel into the combustion chambers of the internal combustion engine 1.

The common rail system with individual accumulators differs from a conventional common rail system in that the fuel to be injected is taken from the individual accumulator 7, with the energy for an injection resulting from the fuel volume elasticity of the fuel in the individual accumulator 7. In practice, the supply line from the rail 6 to the individual accumulator 7 is designed such that the feedback of interference frequencies to the rail 6 is damped. During the injection interval just the right amount of fuel continues to flow from the rail 6, so that the individual accumulator 7 is filled again at the beginning of the injection. Thus, at the beginning of the injection the pressure in the individual accumulator 7 corresponds to the rail pressure pCR. The hydraulic resistance of the individual accumulator 7 and the supply line are coordinated, i.e. the connection line from the rail 6 to the individual accumulator 7 possesses the highest possible hydraulic resistance. On the other hand, in a conventional common rail system without individual accumulators the hydraulic resistance between the rail 6 and the injector 8 should be as low as possible so as to achieve an unobstructed injection.

The operational mode of the internal combustion engine 1 is determined by an electronic engine control unit (ECU) 10. The electronic engine control unit (ECU) 10 contains the usual components of a microcomputer system, for example a microprocessor, I/O components, buffer and memory chips (EEPROM, RAM). In the memory chips the operating data relevant for the operation of the internal combustion engine 1 are applied in characteristic diagrams/characteristic curves. By means of the diagrams/curves the electronic engine control unit 10 calculates the output parameters from the input parameters. FIG. 1 shows an example of the following input parameters: the rail pressure pCR, measured by means of a rail pressure sensor 9, a rotational speed nMOT of the internal combustion engine 1, pressure signals pE of the individual accumulators 7, and an input parameter IN. Under the input parameter IN, for example, a performance requirement, the forced induction pressure of the turbo charger, and the temperatures of the coolant/lubricant as well as of the fuel are combined.

As output parameters of the electronic engine control unit 10, FIG. 1 illustrates a signal PWM to activate the suction throttle 4, a signal SD identifying the injection duration for the cylinder-specific activation of the individual injectors 8, and an output parameter OUT. The output parameter OUT stands for the other control signals to control and adjust the internal combustion engine 1.

Figure 2:
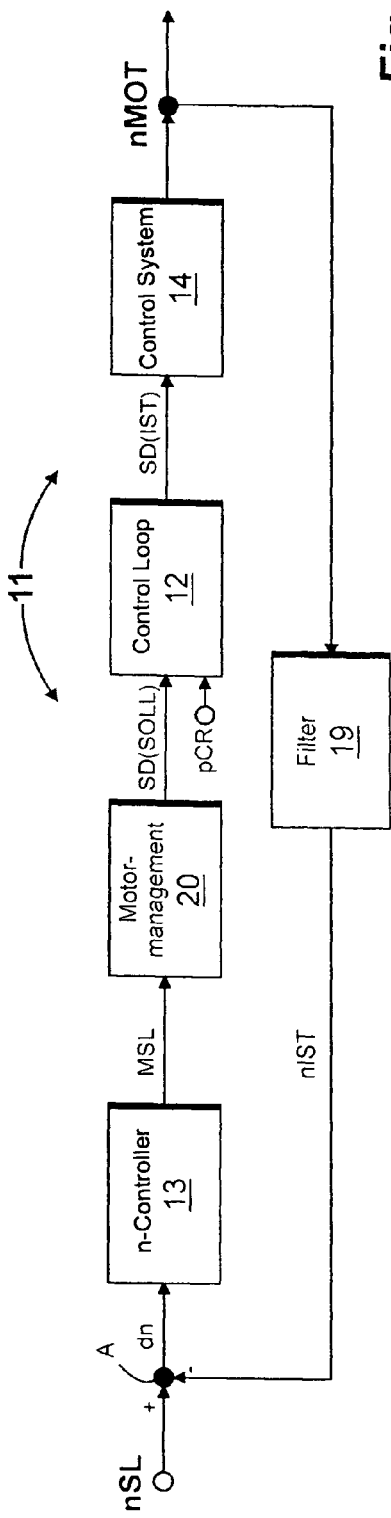
FIG. 2 shows a block diagram of the cascade control.
Figure 3:
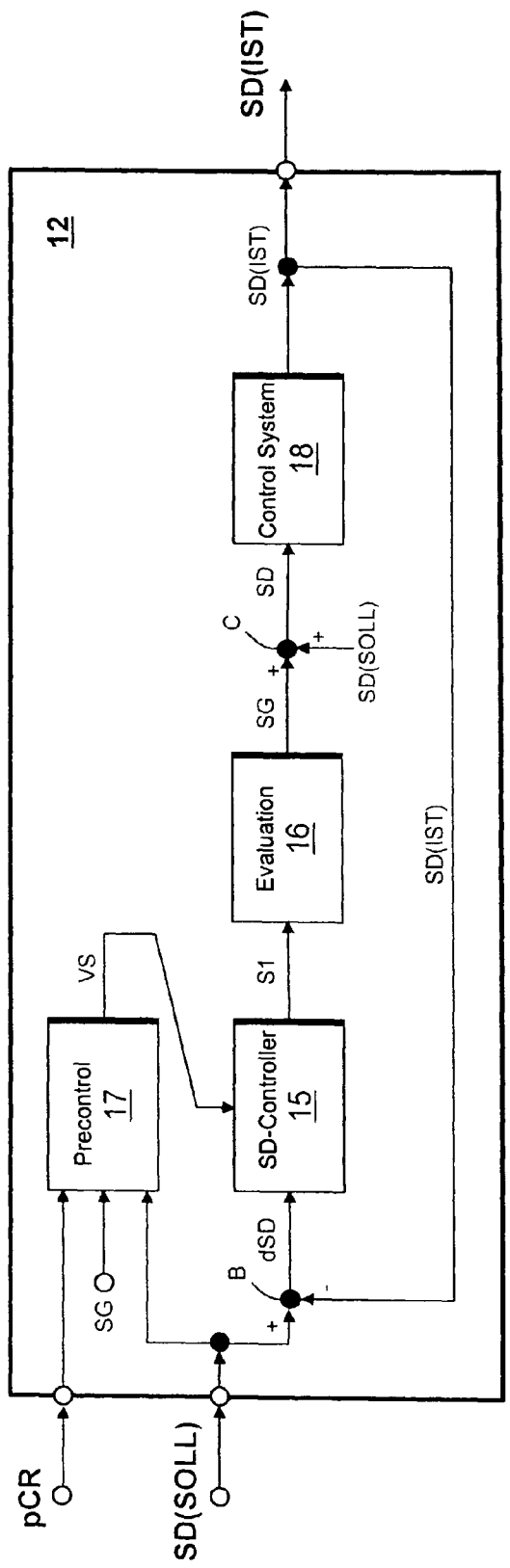
FIG. 3 shows the inner control loop as a block diagram.

FIG. 2 shows a block diagram of the cascade control. The elements illustrated there represent programs, portions of programs or program steps of the control method. The input parameter of the cascade control is the target rotational speed nSL, which is the set point and represents a desired performance. The output parameter of the cascade control corresponds to the raw values of the rotational speed nMOT. The cascade control is comprised of an outer control loop 11 for controlling the rotational speed and an inner control loop 12 for controlling the injection duration. The outer control loop 11 is comprised of a rotational speed controller 13 as a master controller, a unit motor management 20 and a first closed-loop control system 14. The inner control loop 12 is illustrated in FIG. 3 and is described in conjunction with the closed-loop control system 14. The control deviation dn, Point A, is determined from the target rotational speed nSL and an actual rotational speed nIST. The rotational speed controller 13 calculates a target torque MSL from the control deviation dn. In practice, for example, the rotational speed controller is embodied as a PIDT1 controller. From the target torque MSL a target injection duration SD(SOLL) is then determined via the motor management 20. In the unit motor management 20 options for further characteristic efficiency diagrams and limiting functions are provided in addition to the conversion. The target injection duration SD(SOLL) is the set point for the inner control loop 12. The output parameter of the inner control loop 12—here: an actual injection duration SD(IST)—represents the input parameter of the first closed-loop control system 14. The first closed-loop control system 14 is comprised of the internal combustion engine, the low-pressure pump, the suction throttle and the high-pressure pump. The output parameter of the first closed-loop control system 14, namely the controlled variable, corresponds to the raw values of the rotational speed nMOT, which is for example detected at the crankshaft of the internal combustion engine. From the raw values of the rotational speed nMOT the actual rotational speed nIST is calculated via a rotational speed filter 19 and returned to Point A. This way, the control loop is closed.

In FIG. 3, the inner control loop 12 is illustrated as a block diagram, with the elements shown in it also representing programs, portions of programs or program steps of the control method. The input parameters of the inner control loop 12 are the rail pressure pCR and the target injection duration SD(SOLL) as set points. The output parameter of the inner control loop 12 corresponds to the actual injection duration SD(IST). The elements of the inner control loop 12 are comprised of an injection duration controller 15 as follow-up controller, an evaluation 16, a precontrol 17 and second closed-loop controlled system 18, such elements comprising at least the power output stage of the electronic engine control unit and the injector. For the cylinder-specific control of the injectors, as many inner control loops are arranged in parallel as there are injectors. At a summation point B the target injection duration SD(SOLL) is compared with the actual injection duration SD(IST), which yields the injection duration deviation dSD. The actual injection duration SD(IST) is defined via an injection beginning and an injection end. Due to the frequency composition in the rail and the associated pressure variations determining the actual injection beginning by means of the rail pressure is crucial, since misinterpretation is possible. Thus, an embodiment of the invention is provided such that the actual injection duration SD(IST) is calculated from an end of the injection and a virtual injection beginning. The virtual injection beginning in turn is calculated by detecting and storing the cylinder-related individual accumulator pressure pE during a measurement interval, for example a cycle of the internal combustion engine (crankshaft angle of 720°). By means of the saved individual accumulator pressure curve the injection end may be discerned as a significant change in the fuel pressure with absolute certainty. The virtual beginning of the injection is then determined via a mathematical function against the end of the injection. A corresponding mathematical function to determine the virtual beginning of the injection is known from DE 103 44 181 A1.

From the injection duration deviation dSD and a precontrol value VS, the injection duration controller 15 calculates a signal S1. The injection duration controller 15 comprises at least one I portion. The precontrol value VS is determined via the precontrol 17 by means of a characteristic line against the target injection duration SD(SOLL) and the rail pressure pCR. The characteristic line contained in the precontrol 17 is populated with the values of the correcting variable SG and updated with these values. This approach offers the advantage that the adjusting range of the correcting variable survives in full, since age-related variances, for example injector drift, are not adjusted via a persistent injection duration deviation dSD. The precontrol 17 has a corrective effect on the injection duration controller 15, for example on the latter's I portion. The signal S1 calculated by the injection duration controller 15 is examined for reliability via the evaluation 16. The output signal of the evaluation 16 corresponds to the correcting variable SG. If the value of the signal S1 is permissible, no further intervention occurs. Thus, SG equals S1. Otherwise, the signal S1 is limited to a threshold valve and a maintenance recommendation is generated. In this case, SG corresponds to this threshold valve. At a Point C the target injection duration SD(SOLL) is added to the correcting variable SG. The output signal corresponds to the injection duration SD, such output signal representing the input parameter of the second closed-loop controlled system 18. The output parameter of the second closed-loop controlled system 18, namely the auxiliary controlled variable, corresponds to the actual injection duration SD(IST), which is returned to the Point B. Thus, the inner control loop 12 is closed.

The block diagrams of FIGS. 2 and 3 possess the following functionality:

From a desired performance the target torque MSL—and from the latter the target injection duration SD(SOLL)—is determined via a rotational speed controller 13 (master controller), from which target injection duration SD(SOLL) the regulator for controlling the injection duration 15 (follow-up controller) then determines the cylinder-specific correcting variable. Via the regulator for controlling the injection duration 15, non-linearities are linearized in the first section. The second closed-loop controlled system 18 is supplied with the signal of the injection duration SD, whose value is determined from the value of the correcting variable SG and the target injection duration SD(SOLL) during normal operation. If an anomaly is detected in the capture of the auxiliary controlled variable—here: actual injection duration SD(IST)—or in the injection duration controller 15, the injection duration controller 15 is deactivated and switched to control mode. In this case, the second closed-loop controlled system 18 is only supplied with the target injection duration SD(SOLL). This assures continued operations.

In summary, the following advantages for the invention result from this specification:

A cylinder-specific injection duration control is made possible, where the injectors inject the same amount of fuel;

Even in the event the actual injection duration capture or the regulator for controlling the injection duration fails, continued operation is possible;

Age-related variances can be discovered, processed for purposes of diagnostics, and balanced with a constant adjusting range of the correcting variable of the regulator for controlling the injection duration;

The additional coordination expenses to control the cascade are justifiable, since the inner control loop counterbalances the non-linearities.

Although the present invention has been described in relation to particular embodiments thereof, many other variations and modifications and other uses will become apparent to those skilled in the art. It is preferred, therefore, that the present invention be limited but by the specific disclosure herein, but only by the appended claims.

The invention claimed is:

1. A method for controlling an internal combustion engine having a common rail system together with individual accumulators, the method comprising the steps of:
   determining a rotational speed-control deviation (dn) from a target rotational speed (nSL) that represents a set point for an outer control loop to control rotational speed, as well as from the actual rotational speed (nIST);
   determining a target torque (MSL) from the rotational speed-control deviator (dn) via a rotational speed controller as a master controller;
   determining a target injection duration (SD(SOLL)) from the target torque (MSL), the target injection duration (SD(SOLL)) representing the set point for an inner control loop for controlling cylinder-specific injection duration;
   determining an injection duration deviation (dSD) from the target injection duration (SD(SOLL)) and from an actual injection duration (SD(IST));
   determining a correcting variable from the injection duration deviation (dSD) via an injection duration controller as a follow-up controller; and
   determining an injection duration (SD) from the correcting variable and the target injection duration (SD(SOLL)) for activating injectors.

2. The method in accordance with claim 1, further including calculating a precontrol value (VS) via a precontrol to correct the injection duration controller.

3. The method in accordance with claim 2, wherein the precontrol value (VS) is calculated via a characteristic curve at least in dependence on the target injection duration (SD(SOLL)) and rail pressure (pCR), the characteristic curve being populated with values of the correcting variable calculated via the injection duration controller.

4. The method in accordance with claim 1, further including evaluating the correcting variable for allowability, and, in the event of non-allowability, limiting the correcting variable to an upper limit and generating a maintenance recommendation.

5. The method in accordance with claim 1, including calculating the actual injection duration (SD(IST)) from an injection end and a virtual injection beginning.

6. The method in accordance with claim 5, including calculating the virtual injection beginning by detecting and storing a pressure (pE) of a specific individual accumulator during a measurement interval, by determining an end of the injection from a significant change in the fuel pressure (pE) based on the stored pressure curve of an individual accumulator, and determining the virtual beginning of the injection via a mathematical function in dependence on the end of the injection.

* * * * *